July 6, 1943.  I. N. REED  2,323,421
VALVE LUBRICATOR AND SEAL
Filed Sept. 12, 1941   2 Sheets-Sheet 1
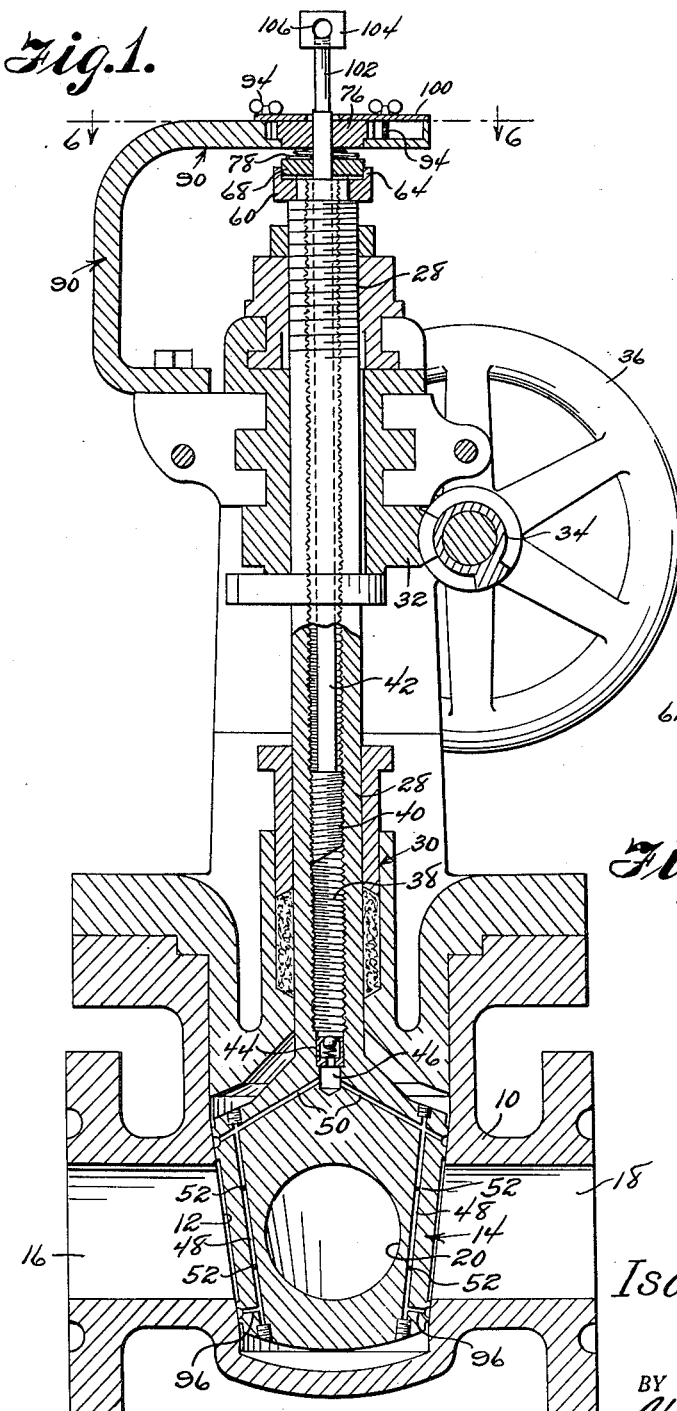
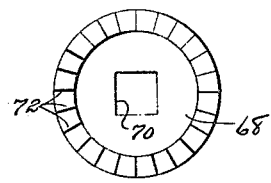
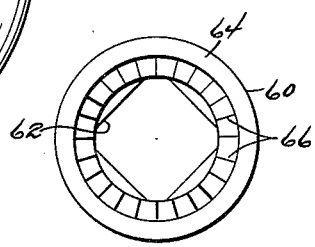
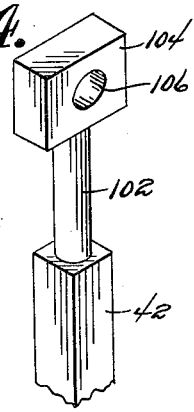
Isaac N. Reed
INVENTOR.
BY
Victor J. Evans & Co.
ATTORNEYS July 6, 1943.  I. N. REED  2,323,421
VALVE LUBRICATOR AND SEAL
Filed Sept. 12, 1941   2 Sheets-Sheet 2
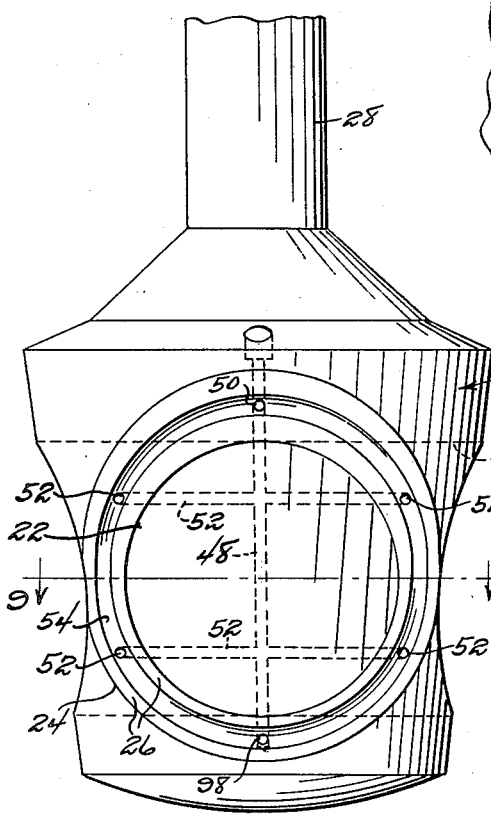
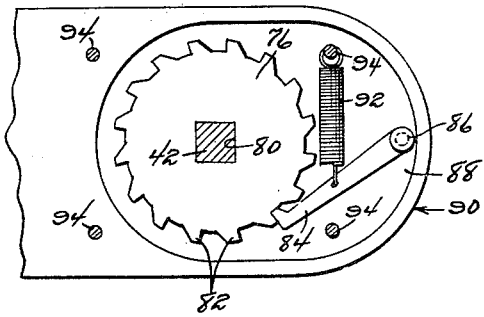
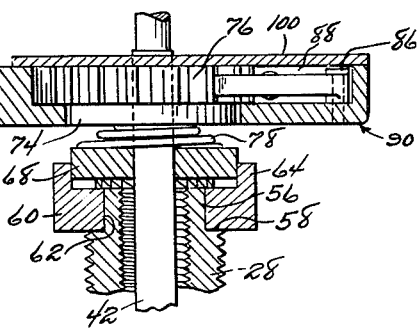
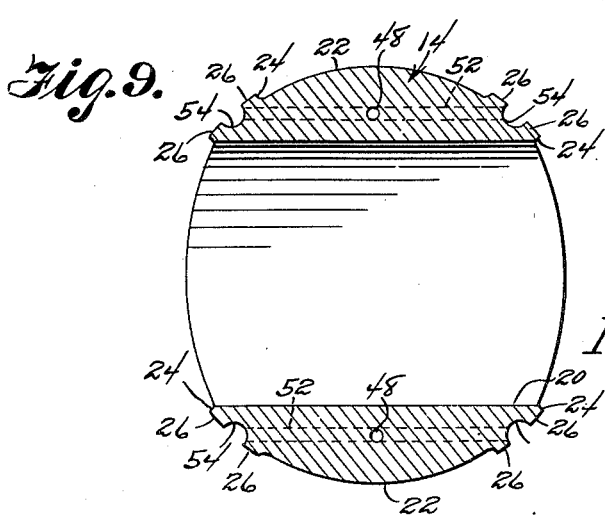
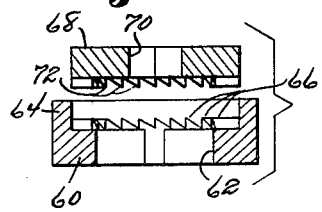
Isaac N. Reed
INVENTOR.
BY
Victor J. Evans & Co.
ATTORNEYS Patented July 6, 1943

2,323,421

UNITED STATES PATENT OFFICE 2,323,421

VALVE LUBRICATOR AND SEAL

Isaac N. Reed, Livingston, Ala., assignor, by mesne assignments, to Wedgeplug Valve Company, Inc., New Orleans, La., a corporation of Louisiana Application September 12, 1941, Serial No. 410,640

2 Claims. (Cl. 251—93)

My invention relates to valve lubrication, and has among its objects and advantages the provision of an improved valve embodying novel means whereby lubricant is automatically applied to the valve seat as a function of valve movement.

In the accompanying drawings:

Figure 1 is a sectional view of a valve embodying my invention;

Figure 2 is a face view of a ratchet element forming a part of the automatic lubricating means;

Figure 3 is a face view of a companion ratchet element;

Figure 4 is a perspective view of one end of a lubricating ram;

Figure 5 is an elevational view of the valve plug illustrated in section in Figure 1;

Figure 6 is a view taken from the position indicated by line 6—6 of Figure 1;

Figure 7 is a sectional detail view illustrating the ratchet elements of Figures 2 and 3 in working relationship;

Figure 8 is a view of the ratchet elements of Figures 2 and 3 partly separated and one part broken away for the purpose of illustration; and Figure 9 is a sectional view taken along the line 9—9 of Figure 5.

In the embodiment selected for illustration, I make use of a valve body 10 provided with a tapered bore 12 for the reception of a correspondingly tapered rotatable valve plug 14. Coaxial inflow and outflow passages 16 and 18 are formed in the valve body 10, and the valve plug 14 is provided with a transverse bore or port 20 arranged for coaxial registration with the passages 16 and 18 when the valve is in an open position. On each of the blind faces 22 of the valve plug 14 is provided a projecting closed ring-like rib 24, each having a seating face 26 engageable with the face of the tapered bore 12. The two seating faces 26 are of the same taper longitudinally of the valve plug 14 so as to have seating engagement throughout their entire circumferences with the face of the tapered bore 12.

To one end of the valve plug 14 is secured a stem 28 which extends through a stuffing box 30 and is provided with a worm gear 32 rotated through the medium of a worm 34 actuated through the medium of a handwheel 36. The valve plug 14 is rotated to its respective opened and closed positions through rotation of the handwheel, this structure being identical with that disclosed in Patent No. 2,125,810. Suffice it to say that the valve plug 14 is rotated ninety degrees and that the valve plug is characterized by a slight longitudinal jacking movement upon the initial opening and final closing movements thereof, so that the seating face 26 will have tight fitting engagement with the wall face of the bore 12 in both the opened and closed positions of the valve plug.

The stem 28 is provided with a longitudinal threaded bore 38 for threaded coaction with a lubricating ram 40 having a stem 42, square in cross section and extending beyond the end of the valve stem 28. In the stem 28 and at the lower end of the bore 38 is provided a check valve 44 communicating with a chamber 46 in the valve plug 14 at the upper end thereof.

Longitudinal lubricant passages 48 are provided in the valve plug 14, which passages have communication with the chamber 46 through the medium of lubricant passages 50. Two transverse lubricant passages 52 are formed in the valve plug 14 on opposite sides thereof, each pair of lubricant passages 52 having communication with one of the lubricant passages 48. Each pair of lubricant passages 52 communicates at their ends with a groove 54 in the seating face 26 in one of the ribs 24, as illustrated in Figures 5 and 9. The lubricant passages 50 also have respective communication with the grooves 54, the latter being closed circles extending throughout the entire circumferences of the respective ribs 24.

The upper end of the stem 28 is provided with a square shank 56 and a shoulder 58, see Figures 1 and 7. A ratchet wheel 60 is provided with a square opening 62 fitting snugly on the projection 56, with the wheel resting on the shoulder 58. An annular flange 64 projects laterally from the upper face of the wheel 60 and this face is provided with teeth 66, all inclined in the same direction. A second ratchet wheel 68 is provided with a square opening 70 fitting the square stem 42 but slidable thereon, the wheel 68 being provided with teeth 72 of reversed inclination and engageable with the teeth 66. The peripheral face of the wheel 68 fits inside the flange 64 so that the stem 42 is effectively supported against lateral deflection and thereby balanced coaxially of the bore 38 to afford protection for the threads of the bore 38.

Between the ratchet wheel 68 and the hub 74 of a ratchet wheel 76 is interposed a compression spring 78 of the cone type which yieldingly holds the ratchet wheel against the wheel 60. A square opening 80 is provided in the ratchet wheel 76 for slidable reception of the stem 42.

All the teeth 82 of the wheel 76 are inclined in the same direction and are engageable by a pawl 84 pivoted at 86 upon the floor 88 of a bracket 90. A tension spring 92 has one end connected with the pawl 84 and its other end looped about one of a plurality of screws 94.

Figure 6 illustrates the action of the pawl 84 in restraining the wheel 76 from counter-clockwise rotation but permitting clockwise rotation thereof. Since the stem 42 has a sliding fit only in the square opening 80, the rotary movement of the stem 42 is determined by the ratchet wheel 76 and its pawl 84.

In operation, the valve plug 14 is moved to an open position through clockwise rotation thereof. Because of the respective inclination of the teeth 66 and 72, the two ratchet wheels 60 and 68 are rotated in a clockwise direction as a unit with the valve stem 28. Since the ratchet wheel 76 is free to move in a clockwise direction, the stem 42, together with its lubricating ram 40, moves as a unit with the valve stem during opening rotation of the valve plug.

When the valve plug 14 is rotated counter-clockwise to a closed position, the ratchet wheel 60 will slip relatively to the ratchet wheel 68. Since the ratchet wheel 76 is latched against counter-clockwise rotation, this ratchet wheel together with the stem 42 of the lubricating ram is restrained from rotation so that the valve stem 28 is rotated relatively to the lubricating ram 40. Such relative rotation between the valve stem 28 and the lubricating ram 40 causes the lubricating ram to be advanced downwardly in the threaded bore 38 to exert pressure on the lubricant contained therein underneath the ram.

Pressure applied to the lubricant in the bore 38 forces the lubricant through all the passages 48, 50 and 52, as well as the two short passages 96, see Figure 1, for filling the two grooves 54 to establish an effective seal as well as to supply lubricant to the engaged surfaces of the valve plug and the wall of the bore 12.

Rotation of the lubricating ram 40 as a unit with the stem 28 when the valve plug 14 is moved to an open position retains the lubricating ram in its previously advanced position and eliminates back lash. Thus the lubricating ram 40 is rotated relatively to the stem 28 only during the closing movement of the valve plug.

The bracket 90 is provided with a recess 98 for the ratchet wheel 76, and the ratchet wheel is confined in the recess by a cover plate 100 detachably secured to the bracket by the bolts 94.

In Figures 1 and 4, the stem 42 is provided with a short shaft 102 which is round in cross section. This cylindrical portion of the stem 42 is greater in length than the axial dimension of the ratchet wheel 76 and moves into this ratchet wheel during the final phase of the downward movement of the ram 40 in the reservoir 38. When the circular portion 102 of the stem 42 extends through the ratchet wheel 76, the stem and ratchet wheel are out of operative relation, and in view thereof the stem will turn during the movement of the plug 14 into closed position and thus indicate a substantial exhaustion of the lubricant in the reservoir 38. The ram 40 may be removed from the stem 28 by detaching the cover 100 and lifting the ratchet wheels 68 and 76 to facilitate the introduction of additional lubricant in the bore. After the reservoir 38 has been refilled, and the ram returned to the reservoir, the ratchet wheel 76 may be again moved onto the non-circular portion of the stem 42 and placed and secured within its housing.

A head 104 is secured to the upper end of the shaft 102, which head is provided with an opening 106 for the reception of a bar to facilitate manual turning of the lubricating ram 40 independently of valve plug adjustment in the event that such independent lubrication is required.

In the closed position of the valve plug 14, the diameters of the respective grooves 54 are larger than the respective diameters of the passages 16 and 18 so as to provide continuous seals extending thereabout. Since the two grooves 54 are in communication with the bore 38, the lubricant pressure is equalized in both the grooves.

Without further elaboration, the foregoing will so fully illustrate my invention, that others may, by applying current knowledge, readily adapt the same for use under various conditions of service.

I claim:

1. In a self lubricating valve, a body having inflow and outflow passages and a valve chamber transverse thereto, a plug rotatable in said valve chamber and provided with grooves facing the wall of said valve chamber, a stem for said plug having a lubricant reservoir communicating with said grooves, a ram mounted in said reservoir and having screw threaded engagement with the wall thereof, a stem fixed to said ram and being of non-circular formation in cross section, a ratchet wheel fixed to the upper end of the stem of said plug, a second ratchet wheel resting upon and engaging said first ratchet wheel and having a non-circular opening through which the non-circular stem of said ram passes, said ratchet wheel holding said reservoir and ram against relative rotation while the said plug is being moved from one of its positions to the other, a bracket fixed to said body and provided with a housing through which the stem of said ram passes, a ratchet wheel rotatably mounted in said housing and having a non-circular portion through which the stem of said ram passes, a pawl mounted in the said housing and engaging the ratchet wheel therein to hold it and the ram against turning movement with the reservoir when said plug is turned into another of its positions, and a coil spring sleeved on the stem of the ram between said second and third ratchet wheels to yieldingly hold said second ratchet wheel in engagement with said first ratchet wheel.

2. In a self lubricating valve, a body having inflow and outflow passages and a valve chamber transverse thereto, a plug rotatable in said valve chamber and provided with grooves facing the wall of said valve chamber, a stem for said plug having a lubricant reservoir communicating with said grooves, a ram mounted in said reservoir and having screw threaded engagement with the wall thereof, a stem fixed to said ram and being of non-circular formation in cross section, a ratchet wheel fixed to the upper end of the stem of said plug, a second ratchet wheel resting upon and engaging said first ratchet wheel and having a non-circular opening through which the non-circular stem of said ram passes, said ratchet wheel holding said reservoir and ram against relative rotation while the said plug is being moved from one of its positions to the other, a bracket fixed to said body and provided with a housing through which the stem of said ram passes, a ratchet wheel rotatably mounted in said housing and having a non-circular portion through which the stem of said ram passes, a pawl mounted in the said housing and engaging the ratchet wheel therein to hold it and the ram against turning movement with the reservoir when said plug is turned into another of its positions, a coil spring sleeved on the stem of the ram between said second and third ratchet wheels to yieldingly hold said second ratchet wheel in engagement with said first ratchet wheel, the stem of said ram having a cylindrical upper portion movable into the opening of said third ratchet wheel during the final phase of the downward movement of said ram in said reservoir, whereby to render said last ratchet wheel ineffective to hold the ram against rotation with said reservoir and thus permit the stems to turn together and thus indicate the substantial exhaustion of the lubricant in the reservoir.

ISAAC N. REED.